United States Patent [19]

Stache et al.

[11] 3,894,006
[45] July 8, 1975

[54] PROCESS FOR MANUFACTURE OF β-(3-OXO-7 α-THIOA CYL-17β-HYDROXY-4-ANDROSTENE-17α-YL) PROPIONIC ACID γ-LACTONES

[75] Inventors: Ulrich Stache, Hofheim, Taunus; Kurt Radscheit, Kelkheim, Taunus, both of Germany

[73] Assignee: Hoechst Aktiengesellschaft, Frankfurt am Main, Germany

[22] Filed: Oct. 3, 1973

[21] Appl. No.: 403,018

[30] Foreign Application Priority Data
Oct. 5, 1972 Germany............................ 2248835

[52] U.S. Cl..................... 260/239.55 R; 260/239.57
[51] Int. Cl........................................... C07c 173/00
[58] Field of Search....../Machine Searched Steroids

[56] References Cited
UNITED STATES PATENTS

| | | | |
|---|---|---|---|
| 3,022,323 | 2/1962 | Schaub et al. | 260/397.3 |
| 3,071,579 | 1/1963 | Ringold et al. | 260/239.55 |
| 3,452,008 | 6/1969 | Buzby et al. | 260/239.57 |

OTHER PUBLICATIONS

Rodds – Chemistry of Carbon Compounds, pages 352 & 353 (1970).

*Primary Examiner*—Henry A. French
*Attorney, Agent, or Firm*—Curtis, Morris & Safford

[57] ABSTRACT

The present invention relates to an improved process for the manufacture of β-(3-oxo-7α-thioacyl-17β-hydroxy-4-androstene-17α-yl)-propionic acid γ-lactones in which a β-(3-oxo-17β-hydroxy-4,6-androstadiene-17γ-yl)-propionaldehyde cyclohemiacetal alkyl glycoside is reacted with a thiocarboxylic acid in a mixture of water and an organic solvent miscible with water to yield a 3-(3'-oxo-7α'-thioacyl-17β'-hydroxy-4'-androstene-17α'-yl)-propionaldehyde cyclohemiacetal alkyl glycoside and in which the compound thus obtained is oxidized in an acid solution, the alkyl glycoside radical in the cyclohemiacetal group being split off, to yield the corresponding γ-lactone; the invention further relates to new intermediates useful in this process and having the formula

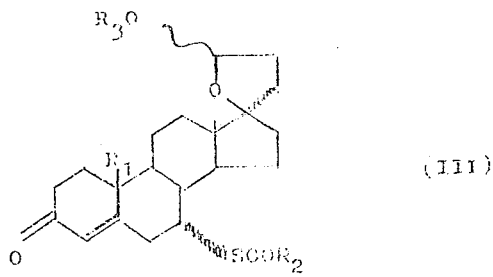

(III)

in which $R_1$ stands for the methyl group or a hydrogen atom and $R_2$ and $R_3$ each for an alkyl group having 1 to 5 carbon atoms.

9 Claims, No Drawings

PROCESS FOR MANUFACTURE OF β-(3-OXO-7α-THIOACYL-17β-HYDROXY-4-ANDROSTENE-17α-YL) PROPIONIC ACID γ-LACTONES

The present invention relates to a novel advantageous process for the manufacture of β-(3-oxo-7α-thioacyl-17β-hydroxy-4-androstine 17α-yl(-propionic acid γ-lactones of the general formula I

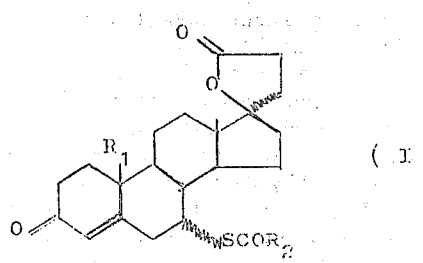

in which $R_1$ stands for a methyl group or a hydrogen atom and $R_2$ stands for an alkyl group having 1 to 5 carbon atoms, wherein a β-(3-oxo-17β-hydroxy-4,6-androstadiene-17α(-yl)-propionaldehyde cyclohemiacetal alkyl glycoside of the general formula II

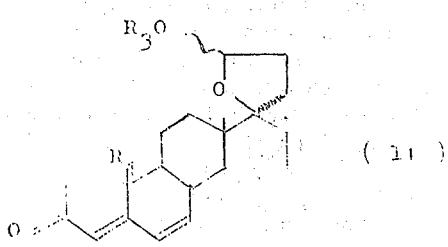

in which $R_1$ is defined as above and $R_3$ stands for an alkyl group having 1 to 5 carbon atoms, is reacted with a thiocarboxylic acid, in a mixture of water and an organic solvent miscible with water, to yield a 3-(3'-oxo-7α'-thioacyl-17β'-hydroxy-4'-androstene-17α'-yl)-propionaldehyde cyclohemiacetal alkyl glycoside of the general formula III

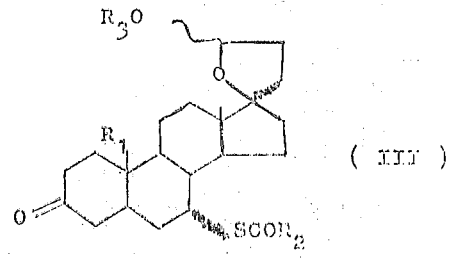

in which $R_1$, $R_2$ and $R_3$ are defined as above, and the compounds thus obtained are oxidized in an acid solution, the alkyl glycoside radical in the cyclo-hemiacetal group being split off, to yield the corresponding γ-lactones of the general formula I.

It was hitherto not possible to prepare 3-(3'-oxo-7α'-thioacyl-17β'-hydroxy-4'-androstene-17γ'-yl)-propionaldehyde cyclohemiacetate alkyl glycosides since, during the addition reaction of thiocarboxylic acids, such as thioacetic acid, with the dienone system of compounds of the formula II, the alkyl glycoside group in the propionaldehyde cyclohemiacetal radical is simultaneously substituted by the thiocarboxylic acid radical and therefore the corresponding 3-(3'-oxo-7α-thioacyl-17'β-hydroxy-4'-androstene-17'γ-yl)propionaldehyde cyclohemiacetal 1-thioacylates of the general formula IV

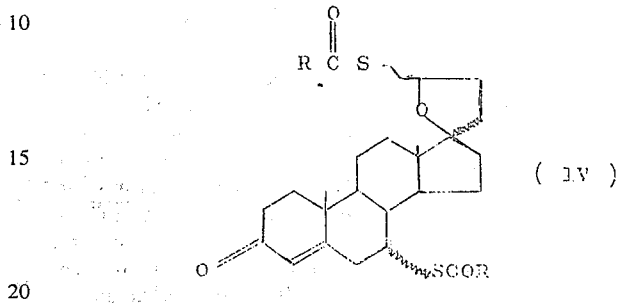

are obtained, in which formula R stands for an alkyl group having 1 to 5 carbon atoms.

The oxidation reaction of compounds of the formula IV, however, usually yields, in addition to the corresponding γ-lactone compounds, by-products which, if a very pure product is to be obtained, have to be eliminated by relatively expensive purification operations, especially by chromatography. (see co-pending U.S. patent application Ser. No. 382,661).

In contradistinction thereto, the propionaldehyde cyclohemiacetal alkyl glycosides of the general formula III obtained by the process of the invention are surprisingly oxidized in a substantially quicker and more gentle manner to yield the spironolactones of the general formula I. Hence, according to the present invention, the products of the invention are obtained in a substantially purer form right from the beginning. By-products formed to a minor extent can be entirely separated by simple operations, for example by recrystallization. Moreover, the oxidation step also affords much better yields than the oxidation of the corresponding dithioacyl compounds.

As starting substances for the process of the invention, there are mentioned the following 3-oxo-4,6-diene steroids: The methyl glycoside, ethyl glycoside, propyl glycoside, butyl glycoside and pentyl glycoside of β-(3-oxo-17β-hydroxy-4,6-androstadiene-17α-yl-)-propionaldehyde cyclohemiacetal as well as the 19-nor derivatives of these compounds. The alkyl group in the alkyl glycoside radical may also be branched. By the way, the structure of the alkyl group is only of minor importance since this group is split off during the process. Being easier to obtain, ethyl glycoside and especially methyl glycoside are preferably used.

These substances may be prepared by reacting a 17-oxosteroid of the general formula

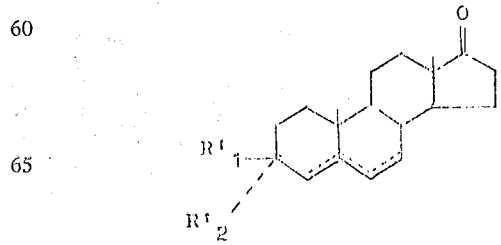

in which R'₁ stands for OH, O-acyl, O-alkyl or O-aryl and R'₂ for hydrogen or R'₁ and R'₂ together stand for an acetal, hemithio-acetal, thio-acetal, enamine, enol ester or enol ether radical, with an organo-metallic derivative formed in situ and corresponding to the formula

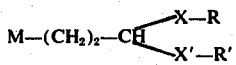

in which X and X', which may be identical or different, each stands for an oxygen or sulfur atom, M stands for an alkali metal ion and R and R', which may be identical or different, each stands for a hydrocarbon radical having 1 to 20, preferably 1 to 10 carbon atoms, or R and R' may also be linked to each other to form a ring together with X and X' and the CH-group, in which case R and R' each preferably contain 2 to 6 carbon atoms, and solvolyzing the γ-hydroxy-acetal or hemithio-acetal or thioacetal of the general formula

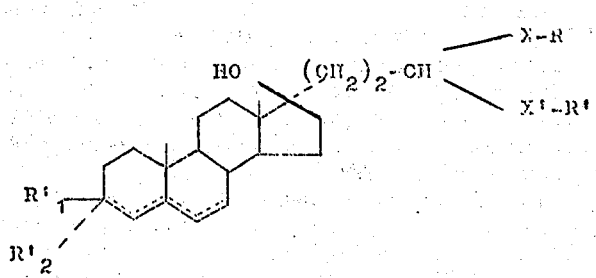

in which R'₁ stands for OH, O-alkyl or O-aryl and R'₂ for hydrogen, or R'₁ and R'₂ together as well as X, X', R and R' are defined as above, according to methods known per se, simultaneously or subsequently etherifying the hydroxy group which may be present in the steroid hemiacetals thus obtained, and converting the compound thus obtained of the formula

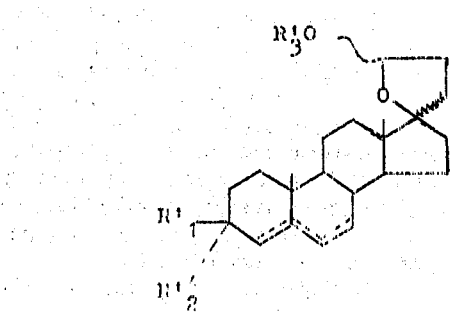

in which R'₁ stands for OH and R'₂ for hydrogen or R'₁ and R'₂ for oxygen, and R'₃ for an alkyl group having 1 to 5 carbon atoms, according to methods known per se either by a usual oxidation reaction of the free 3-hydroxy group and dehydrogenation or - if the 3-oxo group is already present in ring A - only by dehydrogenation, into the corresponding 6-dehydro derivatives of the general formula

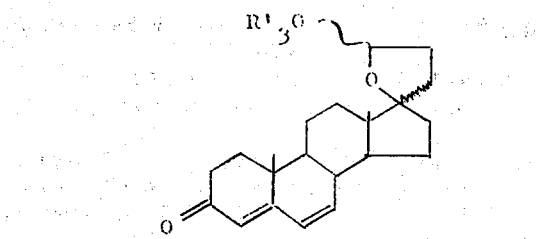

(Copending patent application in the U.S. Ser. No. 382.661). The 19-nor derivatives are prepared in an analogous manner. The β-(3-oxo-17β-hydroxy-4,6-androstadiene-17α-yl)-propionaldehyde cyclohemiacetal methyl glycoside may be very advantageously prepared by oxidizing β-(3β, 17β-dihydroxy-5-androstene-17γ-yl)-propionaldehyde ethylene acetal according to the method of Oppenauer, dehydrogenating the β-(3-oxo-17β-hydroxy-4-androstene-17γyl)-propionaldehyde ethylene acetal obtained with chloranil in methanol with simultaneous cyclization.

According to the present invention, the steroid used as a starting substance is dissolved in a first reaction step in an organic solvent miscible with water, and 0.01 to 10, preferably 0.1 to 0.5 parts by volume of water, calculated on 1 part by volume of solvent used, are added thereto.

As solvents miscible with water, there are especially mentioned: Alcohols, such as methanol, ethanol, propanol, butanol, ethylene glycol or diethylene glycol; ethers, such as tetrahydrofuran or dioxan; and dimethylsulfoxide, dimethylformamide or acetone.

The amount of water to be added most advantageously in each individual case depends, above all, on the dissolution capacity of the solvent used for the steroid chosen and can easily be determined by preliminary tests.

Subsequently, a thiocarboxylic acid, such as thioacetic acid, thiopropionic acid, thiobutyric acid or thiovaleric acid, is added to the reaction mixture in portions of 1 to 30, preferably 1.5 to 3.5 mols, per mol of steroid used. The reaction period ranges from 1 minute to 240 hours, preferably from 1 to 48 hours, at temperatures ranging from −70°C to the boiling point of the reaction mixture, preferably from 0° to 40°C. The thiocarboxylic acid, the solvent, water and steroid may also be mixed in a different succession for carrying out the reaction.

The products of the invention obtained by the first reaction step are isolated either by pouring the reaction mixture into water, whereupon the products can be filtered off — a method which is very advantageous for an industrial-scale production — or, after pouring into water, extracting them in usual manner with an inert organic solvent, such as an ether, chloroform, methylene chloride, benzene, toluene or ethyl acetate, and then isolating them in the usual manner and optionally recrystallizing them.

The reaction products obtained in very good to quantitative yields may be used without recrystallization or further treatment for the following oxidation reaction.

According to the above-mentioned reaction, it is very suprising that the thiocarboxylic acids are selectively added only on the 3-oxo-4,6-diene system to yield the corresponding 7γ-thioacyl compounds, without — as experience has shown when using thiocarboxylic acids without an addition of water — the alkyl glycoside group in the propionaldehyde cyclohemiacetal radical being likewise substituted by the thiocarboxylic acid radical.

The oxidation reaction to be carried out in the second step may generally be performed using all oxidizing agents which are able to oxidize, in an acid solution, aldehydes to acids or cyclohemiacetals to lactones. Especially suitable oxidants are chromium trioxide in an acid solution, especially in lower alkane-carboxylic acids, such as acetic acid, propionic acid or butyric acid, as a solvent but also chromium-sulfuric acid in the cited alkane-carboxylic acids, water being optionally added, too. It is also possible to use chromium-sulfuric acid or chromium trioxide in acetone or dioxan or tetrahydrofuran, to which water may also be added. In all the cases, a chromic acid salt, for example sodium chromate, which is reacted in the acid solution to yield chromic acid or chromium trioxide, may also be used.

Further oxidizing agents to be used for the reaction are, for example, nitric acid or nitrous acid on nitrogen oxides, especially dinitrogen tetroxide; hypohalites, especially HOBr or HOCl; or N-bromo-succinimide or N-chloro-succinimide in an acid solution. The oxidation reaction can furthermore be carried out using an acid permanganate solution, especially a potassium permanganate solution in sulfuric acid, or per acids, for example peracetic acid, perbenzoic acid, m-chloroperbenzoic acid or perphthalic acid.

The oxidation reaction is generally performed in inert organic solvents, such as glacial acetic acid, acetic acid anhydride, acetone, dioxan, tetrahydrofuran, or dimethylsulfoxide, or in chlorinated hydrocarbons, such as methylene chloride, chloroform or carbon tetrachloride, optionally in the presence of water. The addition of water is of special advantage if nitric acid, nitrous acid or permanganates are used as oxidants.

The reaction temperatures generally range from −20° to +80°C and the reaction times from about 1 minute to 48 hours, depending on the oxidizing agent and the reaction temperature chosen.

The products of the invention are isolated according to the usual methods, for example by pouring the mixture into water, extracting it with an inert organic solvent and recrystallizing the residue obtained from a suitable solvent or mixture of solvents.

According to an especially advantageous embodiment of this second reaction step, a solution of 1.2 to 2 mol-equivalents of chromium trioxide, calculated on steroid used, in aqueous sulfuric acid is added within 2 to 5 hours at a temperature of from 0° to 50°C to a solution of the β-(3-oxo-7α-thioacyl-17β-hydroxy-4,6-androstadiene-17α-yl)-propionaldehyde cyclohemiacetal methyl glycoside in glacial acetic acid. After stirring has been continued for 1 to 6 hours at a temperature of 0° to 50°C, the reaction product may be worked up in the usual manner disclosed above. In order to separate slight amounts of starting material, if any, or slight amounts of by-products which may have formed during the reaction, the crude products obtained are advantageously recrystallized from a suitable solvent or mixture of solvents, for example advantageously successively from methanol, where required with an addition of a slight amount of acetone, and from isopropanol/diisopropyl ether or isopropanol/diethyl ether.

The products of the invention obtained are so pure that purification by chromatography, which would involve considerable expense for its operation, is not required. As compared to the process disclosed in the above-cited copending Patent Application for the manufacture of spironolactone, the process of the invention provides the product in an about two- to three-fold yield.

In comparison to the known process for the manufacture of spironolactone [cf. Ehrhart/Ruschig "Arzneimittel," pages 953 and 1,000 (1968)], the process of the invention has the advantage of requiring fewer steps for its manufacture, dispensing with acetylene which is difficult and dangerous to handle and, moreover, providing spironolactone in a substantially higher yield.

The products of the invention, especially the spironolactone, reduce the release of aldosterone.

The following Examples illustrate the invention.

EXAMPLE 1 a. 17.7 ml of thioacetic acid were added to a solution of 35.7 g of β-(3-oxo-17β-hydroxy-4,6-androstadiene-17α-yl)-propionaldehyde cyclohemiacetal methyl glycoside in a mixture of 142.5 ml of methanol and 35.7 ml of water ( an incomplete dissolution of the steroid is not detrimental to the reaction since during the reaction the substance is gradually dissolved entirely with stirring). The reaction mixture was stirred for 16 hours at 20°C and then poured while stirring into 1 l of water, whereupon a precipitate separated. The aqueous phase was neutralized and the precipitate was suctionfiltered after having been allowed to stand for some hours. The precipitate thus obtained was suction-filtered, washed with water and dried in vacuo over $P_2O_5$. 40.2 g of β-(3-oxo-7α-thioacetyl-17β-hydroxy-4-androstene-17α-yl)-propionaldehyde cyclohemiacetal methyl glycoside were obtained as an amorphous crude product which was used for the following reaction without further treatment. Melting point: about 90°C (measured in a Tottoli apparatus).

UV: (in methanol): λmax. = 238 μm (ε=19500);

No peak at λmax. 280 μm (dienone structure).

IR (in KBr):

IR spectrum (in KBr, only characteristic bands are cited): 2940, 1670-1685, 1615, 1430, 1370, 1350, 1325, 1265, 1235, 1200, 1125, 1095, 1035, 1005, 945, 860, 630 $cm^{-1}$.

Thin-layer chromatography: (twice developed with ethyl acetate/cyclohexane 1:1; sprayed with 20% ethanolic p-toluene-sulfonic acid; heated for 10 minutes to 100°C) $R_f$: ~0.55 (relative)

b. 2.5 ml of thioacetic acid were added while stirring to a solution of 5 g of β-(3-oxo-17β-hydroxy-4,6-androstadiene- 17α-yl)-propionaldehyde cyclohemiacetal methyl glycoside in a mixture of 20 ml of tetrahydrofuran and 5 ml of water. Stirring was continued for 18 hours at 20°C and the reaction mixture was then poured into 400 ml of water. After neutralization with sodium bicarbonate, the mixture was extracted with methylene chloride, the extracts were washed with water, dried and the solvents were distilled off in vacuo. The β-(3-oxo-7α-thioacetyl-17β-hydroxy-4-androstene-17α-yl)-propionaldehyde cyclohemiacetal methyl glycoside was obtained as a residue (6.5 g), which was used for the following reaction without further treatment.

EXAMPLE 2 a. A solution of 1.95 g of chromium trioxide in 14.3 ml of water and 1.48 ml of concentrated sulfuric acid was added dropwise while stirring within 3 hours at 40°C to a solution of 6 g of β-(3-oxo-7α-thioacetyl-17β-hydroxy-4-androstene-17α-yl)-propionaldehyde cyclohemiacetal methyl glycoside in 60 ml of glacial acetic acid. After stirring had been continued for 2 hours at 40°C, the reaction mixture was introduced into 800 ml of methylene chloride, the residue of chromium compounds remaining in the reaction vessel was digested three times with 50 ml of methylene chloride each and the combined methylene chloride phases and extracts were washed (three times) with water and dried over sodium sulfate. The methylene chloride was then distilled off in vacuo at 40°C and the amorphous residue obtained was digested with 20 ml of methanol, whereupon the reaction product crystallized. After filtration, the crude spironolactone obtained (4.39 g) was dissolved in 20 to 30 ml of acetone and about 1 g of charcoal was added. After having been boiled for a short time, the mixture was filtered through a clarifying layer filter, the filter residue was washed several times with acetone and the combined acetone filtrates were concentrated in vacuo. The residue obtained was recrystallized successively from methanol/acetone (about 12 ml:4ml) and from propanol-2/diisopropyl ether. After drying, 2.85 g of β-(3-oxo-7α-thioacetyl-17β-hydroxy-4-androstene-17α-yl)-propionic acid γ-lactone (=spironolactone) were obtained, m.p. 200°–201° C (determined by a Tottoli apparatus). $[\alpha]_D^{20} = -33.8°$ (C=0.5; HCCl₃)

UV: λmax.=238 μm (ε=20300) (in methanol)

Thin-layer chromatography: (developed twice with ethyl acetate/cyclohexane 1:1; sprayed with 20% ethanolic p-toluene-sulfonic acid; heated to 100°C for 10 minutes) $R_f$:0.3 (relative, no more spots)

IR (KBr): entirely identical with genuine spironolactone b. 7.8 ml of Jones reagent which had been prepared by adding dropwise 11.5 ml of concentrated sulfuric acid at 0°C to a solution of 13.36 g of chromium trioxide in 30 ml of water and completing with water at 20°C to a volume of 50 ml, were added dropwise while stirring within 20 minutes at 0°C to a solution of 5 g of β-(3-oxo-7α-thioacetyl-17β-hydroxy-4-androstene-17α-yl)-propionaldehyde cyclohemiacetal methyl glycoside in 165 ml of acetone. After stirring had been continued for 2.5 hours at 0°C, the reaction mixture was introduced into 400 ml of methylene chloride. The methylene chloride phase was washed several times with water, dried and distilled in vacuo. The residue obtained was treated further as disclosed in Example 2 (a). 2.4 g of spironolactone having the same degree of purity as in Example 2 (a) were obtained.

c. A solution of 1.4 g of chromium trioxide in 20 ml of a 90% aqueous acetic acid was added dropwise while stirring within 1.5 hours at 40°C to a solution of 4.3 g of β-(3-oxo-7α-thioacetyl-17β-hydroxy-4-androstene-17α-yl)-propionaldehyde cyclohemiacetal methyl glycoside in 86.5 ml of glacial acetic acid, while preventing the temperature from rising beyond 40°C. Stirring was continued for 4.5 hours at 40°C, whereupon the solution was poured into 1 l of methylene chloride and worked up and treated further as disclosed sub (a). 1.8 g of spironolactone having the same degree of purity as sub (a) were obtained.

We claim:
1. A compound of the formula

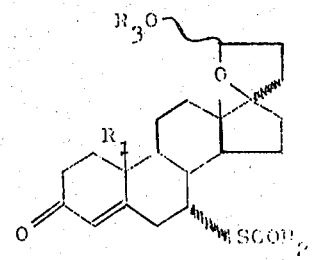

in which $R_1$ stands for the methyl group or a hydrogen atom and $R_2$ and $R_3$ each stand for an alkyl group having 1 to 5 carbon atoms.

2. A compound as claimed in claim 1, wherein $R_2$ and $R_3$ each stand for the methyl group.

3. A method for making a β-(3-oxo-7α-thioacyl-17β-hydroxy-4-androstene-17α-yl)-propionic acid γ-lactone of the formula

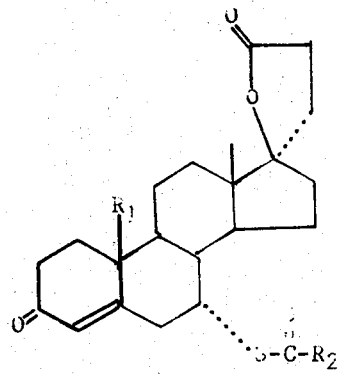

wherein $R_1$ is methyl or hydrogen and $R_2$ is alkyl having 1 to 5 carbon atoms, which comprises reacting a β-(3-oxo-17β-hydroxy-4,6-androstadiene-17α-yl)-propionaldehyde cyclohemiacetal alkyl glycoside of the formula

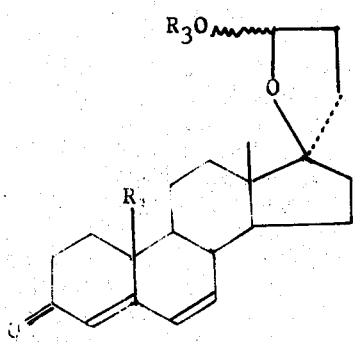

wherein $R_1$ is as earlier defined and $R_3$ is alkyl having 1 to 5 carbon atoms, with a thiocarboxylic acid in a mixture of water and an organic solvent miscible with water, whereby a 3-(3'-oxo-7'α-thioacyl-17β'-hydroxy-4'-androstene-17α'-yl)-propionaldehyde cyclohemiacetal alkyl glycoside of the formula

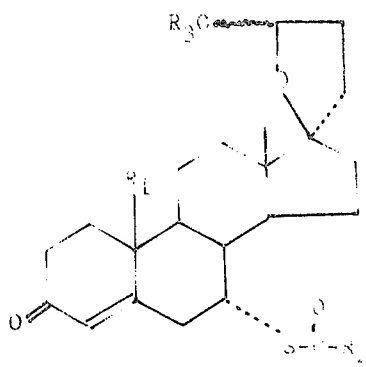

wherein $R_1$, $R_2$, and $R_3$ are as earlier defined, is obtained, and then oxidizing said last-mentioned compound in acid solution to obtain the desired corresponding γ-lactone.

4. A method as in claim 3 wherein said organic solvent miscible with water is an alcohol of an ether.

5. A method as in claim 3 wherein said organic solvent miscible with water is methanol, ethanol, propanol, butanol, ethylene glycol, diethylene glycol, tetrahydrofuran, dioxan, dimethylsulfoxide, dimethylformamide, or acetone.

6. A method as in claim 3 wherein said mixture contains 0.01 to 10 parts by volume of water per part by volume of organic solvent.

7. A method as in claim 3 wherein said mixture contains 0.1 to 0.5 part by volume of water per part by volume of organic solvent.

8. A method as in claim 3 wherein from 1 to 30 mols of thiocarboxylic acid are reacted per mol of said androstadiene compound.

9. A method as in claim 3 wherein from 1.5 to 3.5 mols of thiocarboxylic acid are reacted per mol of said androstadiene compound.

* * * * *